United States Patent [19]

Kenmoti et al.

[11] Patent Number: 5,007,947
[45] Date of Patent: Apr. 16, 1991

[54] METHOD FOR THE MANUFACTURE CAMERA MIRROR-DRUM

[75] Inventors: Kazuei Kenmoti, Hirakata; Masamitu Miyazaki, Kadoma, both of Japan

[73] Assignee: Matsushita Electric Industrial Co. Ltd., Osaka, Japan

[21] Appl. No.: 334,837

[22] Filed: Apr. 7, 1989

[30] Foreign Application Priority Data

Apr. 8, 1988 [JP] Japan .................. 63-87471

[51] Int. Cl.$^5$ ............................. C03C 25/02
[52] U.S. Cl. ......................... 65/3.43; 65/3.44; 65/4.3; 65/10.2; 65/70; 264/1.7; 264/109
[58] Field of Search ............ 65/2, 3.43, 3.44, 62, 65/4.3, 10.2, 70; 264/1.7, 109; 428/361, 378

[56] References Cited

U.S. PATENT DOCUMENTS

| 4,026,478 | 5/1977 | Albert et al. | 65/2 X |
| 4,124,363 | 11/1978 | Kawai | 65/2 |
| 4,366,287 | 12/1982 | Thorpe | 428/378 X |
| 4,622,184 | 11/1986 | Barnhardt et al. | 264/1.7 X |
| 4,752,527 | 6/1988 | Sanzero et al. | 65/3.43 X |
| 4,840,755 | 6/1989 | Nakazawa et al. | 65/10.2 X |

Primary Examiner—Robert L. Lindsay
Attorney, Agent, or Firm—Panitch, Schwarze, Jacobs & Nadel

[57] ABSTRACT

A camera mirror-drum with good precision and strength comprising a molded part in which glass fibers with an aspect ratio of 3-7 are dispersed in a resin at the overall proportion of 35-40% by weight, and a method and an apparatus for the manufacture of the mirror-drum.

5 Claims, 4 Drawing Sheets

METHOD FOR THE MANUFACTURE CAMERA MIRROR-DRUM

BACKGROUND OF THE INVENTION

1. Field of the Invention

This invention relates to a resin mirror-drum for use in cameras such as photographic cameras, VTR cameras, monitor cameras, and the like, and to a method for the manufacture thereof.

2. Description of the Prior Art

In the recent years, camera models have been improved by the addition of autofocussing function and a zoom function; in particular, the resolution of VTR cameras is being increased. On the other hand, cameras are needed to be made at low cost, and the mirror-drums that are essential to attain these functions are more frequently being made of resin.

Polycarbonates are the main kind of resin used for the mirror-drum; at times, polyphenylene oxide (NORYL; a trademark of EPL Co.), or where particular precision is not needed, polybutylene terephthalate or the like, are used. With these resins, glass fibers with the diameter of 10–20 μm, or at times, carbon fibers with the diameter of 2–10 μm, are admixed as fillers to increase the strength of the resins and also to maintain fixed measurements over a long period of use.

However, resin mirror-drums are not used in high-quality cameras. The mirror-drum of high-quality cameras is made of aluminum. The reason is described below with a zoom lens for typical VTR cameras:

FIG. 7 shows a zoom lens for a conventional VTR camera. Lenses 15, 16, and 17 that form a group of lenses are fixed onto a focussing-lens frame 18. An external helicoid thread 19 that is formed in the focussing-lens frame 18 fits into an internal helicoid thread 21 that is formed on the camera body 20. A cam frame 22 is rotatably disposed inside of the body 20. A cam follower 23 fits into cam grooves of the cam frame 22. The cam follower 23 is fastened to movable frames 24 and 25 so as to be one piece with them. These movable frames 24 and 25 are guided by a guide pole 30 in the direction of the optical axis. To the movable frame 24 there are fixed lenses 26, 27, and 28, which form a group of lenses for changes in magnification, to the movable frame 25 there is fixed a compensating lens 29. To the body 20, a lens 31 and a master lens-frame 32 are fixed. Reference numerals 33, 34, 35, and 36 are lenses that form the master lens group; and reference numeral 37 is the CCD image sensor that changes images into electrical signals.

The above-mentioned construction must be designed so that the focussing-lens frame 18 and the cam frame 22 can smoothly rotate inside of the body 20, and moreover, the lenses must be supported so as not to become inclined. For that reason, the following conditions are essential: (1) that the roundness of each part and the precision of the shapes of the screws be excellent; (2) that the hardness of the body 20 be sufficient that a slight external force should not cause deformation; and (3) that the thermal expansion coefficient of the body 20 and of each of the frames 18 and 22 be close to that of the lenses, so that even at high or low temperatures, the slight clearance between the inside surface of the body and each of the frames be maintained so that each of the frames can rotate smoothly. However, the above-mentioned resins that contain fibers as a filler (i.e., fiber-reinforced plastics) are inferior to aluminum in all three of these points, so they cannot be used in high-quality cameras.

Therefore, so that the functions and the qualities of cameras can be improved and so that the cameras can be manufactured at low cost, a plastic that is satisfactory in these three points is needed.

The following is already known about fiber-reinforced plastics: (1) the hardness of plastics increases as the amount of fibers used for filling increases; (2) the phenomenon described in the preceding item 1 is more marked as the fiber length increases, but there is not further increase in the phenomenon when the fibers have above a certain aspect ratio (length of fiber/diameter of fiber); (3) the thermal expansion coefficient of plastics increases as the amount of fibers used for filling increases; (4) the phenomenon described in the preceding item 3 is greater in the direction of the orientation of the fibers as the fiber length increases, but in the direction at right angles to the orientation of the fibers, there is almost no such effect; and (5) the effect of the orientation of the fibers increases as the fiber length increases, and accurate molding becomes difficult.

It is generally decided from the above, that the amount of glass fibers for fiber-reinforced plastics for use in camera mirror-drums should be 20 to 30% by weight (11–17% by volume), and that the aspect ratio should be 10–30.

These fiber-reinforced plastics can be made by the following process. Extremely long glass-fiber roping is chopped first to lengths of about 6 mm, and the chopped glass obtained and a matrix polymer (a mixture of polycarbonate, polyphenylene oxide, or the like, and small amounts of a stabilizer, coloring agent, lubricant, and other ingredients) are weighed and blended at specified proportions; then the mixture is kneaded by a screw-type extruder as shown in FIG. 8. The blended material supplied to a hopper 38 is conveyed onward into a cylinder 41 by a screw 40 driven by the rotation of a motor 39. The matrix polymer is fused by the heat of cylinder heaters 42 and the that given rise to by friction and shearing during the rotation of the screw 40. The chopped glass inside the screw channel is put under considerable pressure, and is broken up and dispersed into the molten matrix. Because of the coupling of the glass fibers beforehand, this dispersion takes place smoothly, and the strength of the composition obtained is satisfactory.

The depth of the screw channel of the screw 40 gradually decreases toward the tip of the screw 40, and the shape of the screw is designed so as not merely to convey the blended material forward but so as to help prevent flowing. Accordingly, the glass fibers that are dispersed in the polymer are chopped efficiently.

There is a strand die 43 at the top of the cylinder 41 from which is extruded the molten plastic composition in the shape of a rope. The extruded plastic is cooled in a water-bath 44, and the cooled and hardened plastic is cut fine by cutter 45 into pellets with length of 2–5 mm. This is used as a material for molding.

At this stage, the aspect ratio of the fibers in the material is kept as a value close to that of the final product. However, by the above method, the length to which the glass fibers are cut is not directly decided; cutting depends on the shearing stress at the time of movement forward and kneading depends on the shape of the screw, and there is a range of lengths of the fibers from short to long; manufacturing conditions are decided so that the mean length will generally be within the desired range.

If the glass fibers are chopped so as to be close to the length of the final aspect ratio before the introduction of the material into the hopper 38, the aspect ratio will be very uniform, so it should be possible to obtain glass fibers with a stable mean aspect ratio. However, when the aspect ratio is to be 10–30, it is necessary to use a cutter with a knife set at a pitch of about 0.1–0.6 mm. Cutters that cut glass are readily damaged by abrasion, so they are designed so as to be replaceable. For this reason, it is difficult to achieve this kind of construction to cutters with the above-mentioned pitch.

The material for molding formed in this way is dried sufficiently and supplied to an injection molding apparatus, and a camera mirror-drum is molded.

FIG. 9 is a part of an injection molding apparatus in which the material for molding is supplied to a hopper 46, and by the rotation of a screw 47, the material is supplied toward the front of a cylinder 48 while being heated. While the molten material is being moved forward by the screw 47 that is driven by an injection cylinder 50, it is injected into a mold 49, where the resulting molded product is cooled. Then it is removed from the mold 49.

FIG. 10 shows the screw 47 of the injection molding apparatus of FIG. 9, which generally is a full-flight screw, in which the screw channel is uniformly arranged, unlike the screws of the extruders for kneading. The depth of the screw groove gradually decreases from the hopper side thereof, with the shallowest part close to the tip thereof; the ratio $d_1/d_2$ and $d_1$ is the depth of the groove near the hopper and $d_2$ is the depth of the groove near the tip is called the constriction ratio. The value of this ratio is generally about 2–3; the larger this value, the better is the kneading that is achieved, and the debubbling effect is also good. However, some glass fibers with a large aspect ratio are cut when passing through this screw groove, and some are also cut when being injected into the mold. Accordingly, the aspect ratio of the glass fibers in the final product varies depending on the conditions of the rotation of the screw and on the injection conditions. Therefore, the conventional method and apparatus described above raise the following problems: (1) because the lengths of the fibers differ, the material for molding has different contraction coefficients, and the measurements of products obtained by the use of the same mold differ, causing difficulty in fitting, for example, one screw product into the other; and (2) products with different accuracy of molding are obtained, and it is not possible to ensure the stable positioning of the lenses.

SUMMARY OF THE INVENTION

The camera mirror-drum of this invention, which overcomes the above-discussed and numerous other disadvantages and deficiencies of the prior art, comprises a molded part in which glass fibers with an aspect ratio of 3–7 are dispersed in a resin at the overall proportion of 35–40% by weight.

In a preferred embodiment, the resin is polycarbonate.

The method for the manufacture of camera mirror-drums of this invention comprises the steps of fusing glass in a vessel, drawing the fused glass from small holes in the bottom of said vessel to form glass fibers, forming indentations at regular intervals in said glass fibers, hardening said glass fibers, chopping said glass fibers at regular intervals so that the chopped fibers are of uniform length, blending the chopped glass fibers of uniform lengths into a resin at certain proportions, and injection molding the mixture to produce a camera mirror-drum.

In a preferred embodiment, the spacing of said indentations that are formed in said glass fiber is about 3–7 times the diameter of the glass fiber.

In a preferred embodiment, the glass fibers are dispersed in said resin at the overall proportion of 35–40% by weight.

In a preferred embodiment, the resin is polycarbonate.

In a preferred embodiment, the glass fibers are chopped at the indentations by the bending of said glass fibers.

The apparatus for the manufacture of the camera mirror-drum comprises a means for fusing glass in a vessel, a means for drawing the fused glass in a monofilament form and for forming indentations in the glass fibers, a means for hardening the glass fibers, a means for chopping the glass fibers with indentations so that the chopped glass fibers will be of uniform lengths, a means for blending the chopped glass fibers with a resin, and a means for carrying out the injection molding of the mixture.

In a preferred embodiment, the means for drawing the fused glass in a monofilament form and for forming indentations in the glass fiber is composed of a pair of rollers, a pending roller, and a molding roller, and said glass fiber passes through the space therebetween.

In a preferred embodiment, the projections are provided at regular intervals on said molding roller.

In a preferred embodiment, the pitch of the projections that are provided on said molding roller is 3–7 times the diameter of the glass fiber.

Thus, the invention described herein makes possible the objectives of (1) providing a camera mirror-drum that is of good accuracy and that is strong; (2) providing a method for the production of the camera mirror-drum; and (3) providing an apparatus for the production of the camera mirror-drum.

BRIEF DESCRIPTION OF THE DRAWINGS

This invention may be better understood and its numerous objects and advantages will become apparent to those skilled in the art by reference to the accompanying drawings as follows:

FIG. 1b is a perspective view showing the apparatus of FIG. 1a.

FIG. 2 is a sectional diagram showing a part of the apparatus of FIG. 1a.

FIG. 3 is a sectional side view showing a glass fiber obtained from the use of the apparatus of FIG. 1a.

DESCRIPTION OF THE PREFERRED EMBODIMENTS

Figure 1A:
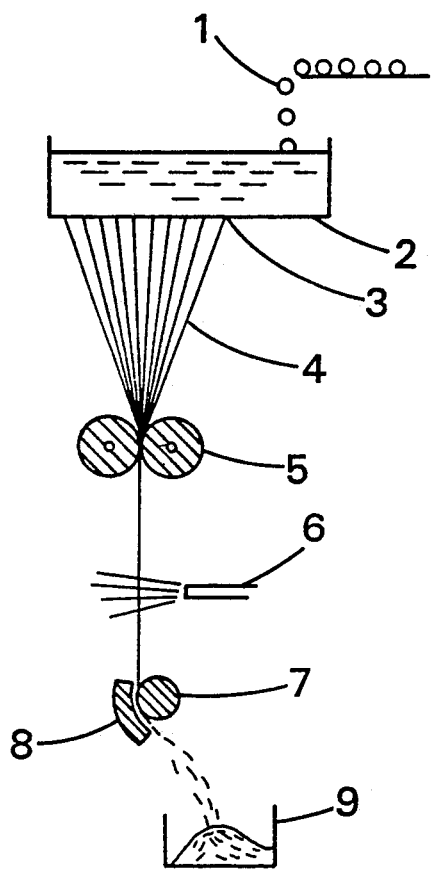
FIG. 1a is a sectional diagram showing an apparatus for the manufacture of glass fibers of this invention.
Figure 1B:
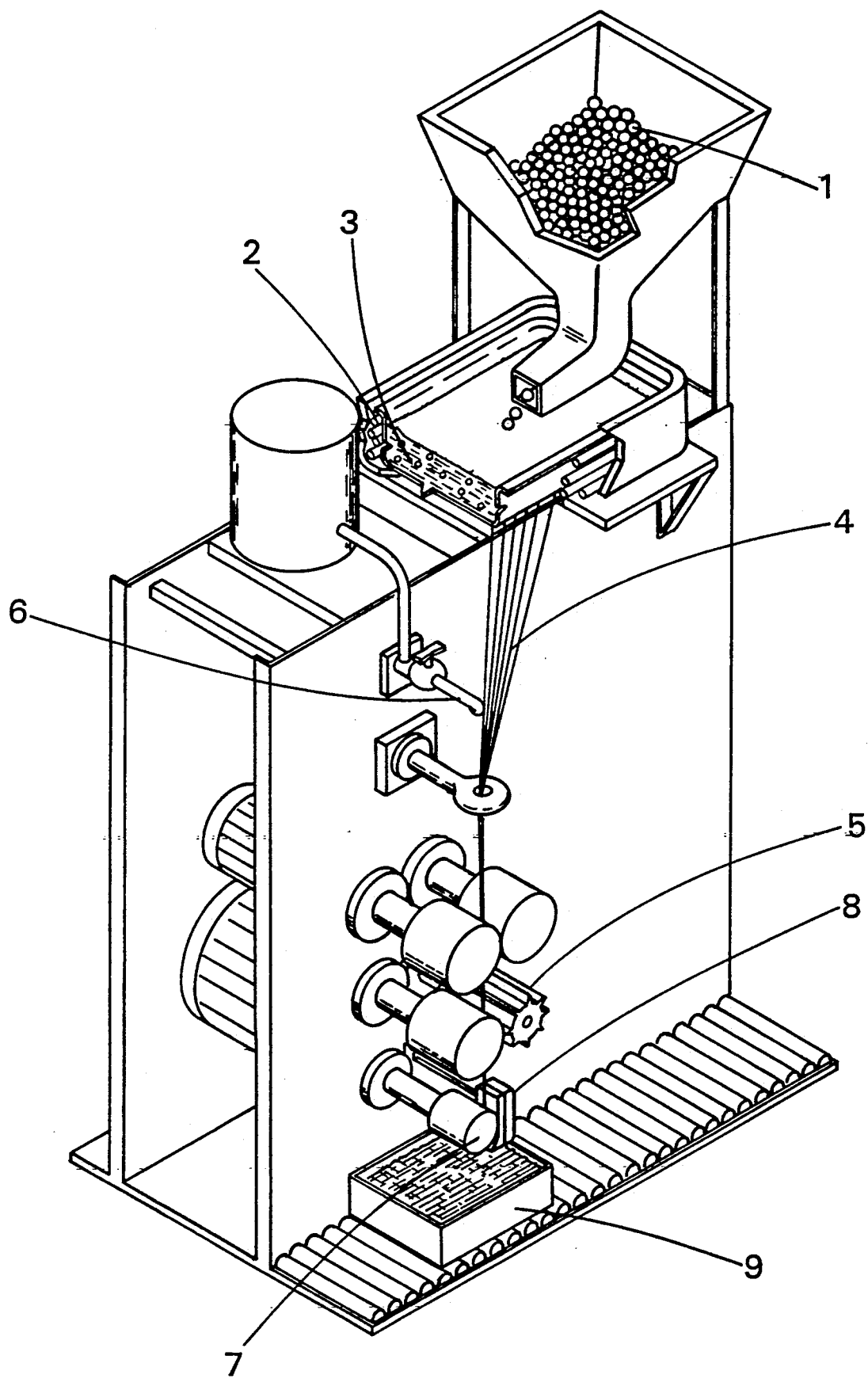

FIGS. 1a and 1b show a manufacturing process of the glass fibers of this invention.

Marbles 1 of non-alkaline glass (E glass) are fused in a pot 2, and glass fibers 4 are drawn from small holes 3 in the bottom in monofilament form by the pulling of rollers 5. The fibers are then cooled and sprayed with a surface treatment agent by means of sprayer 6; then a roller 7 and a guide 8 work together to chop the fibers. The glass fibers that have been chopped short accumulate in a receiving plate 9.

Figure 2:
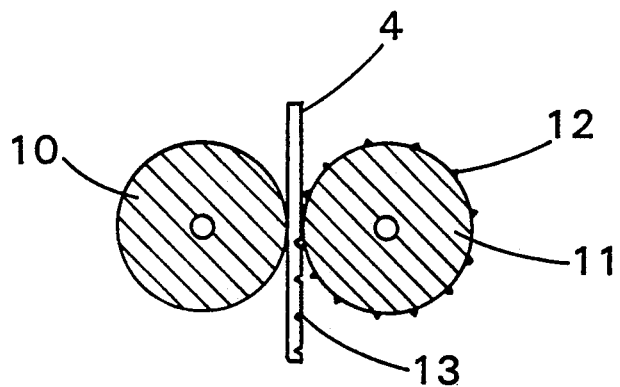

FIG. 2 shows the rollers 5. When a glass fiber 4, a monofilament, passes through the space between the sending roller 10 and the molding roller 11, the projections 12 that are provided on the molding roller 11 form indentations 13 in the glass fiber 4.

The temperature at which these indentations 13 are formed should be a temperature near that at which the glass softens.

Figure 3:
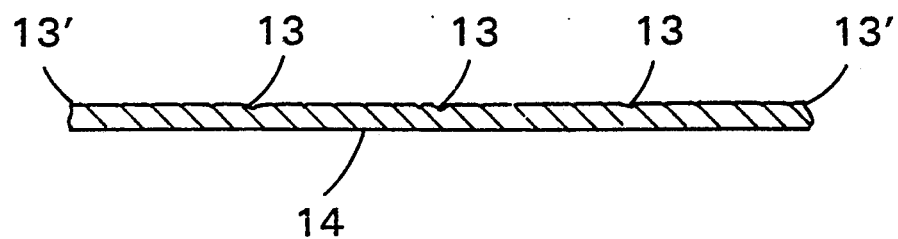

FIG. 3 shows an example of glass fibers that accumulate on the receiving plate 9 shown in FIG. 1a. The spacing of the indentations 13 formed is about 7 times the diameter of the glass fiber 14. At the end surfaces 13', it is observed that the glass fiber has been chopped at the place of the indentation.

The spacing is decided in general by the pitch of the projections 12 in the molding roller of FIG. 2. Therefore, by the use of a molding roller the pitch of which can be set freely, it is possible to form indentations 13 of the desired spacing.

EXAMPLE 1

Figure 4:
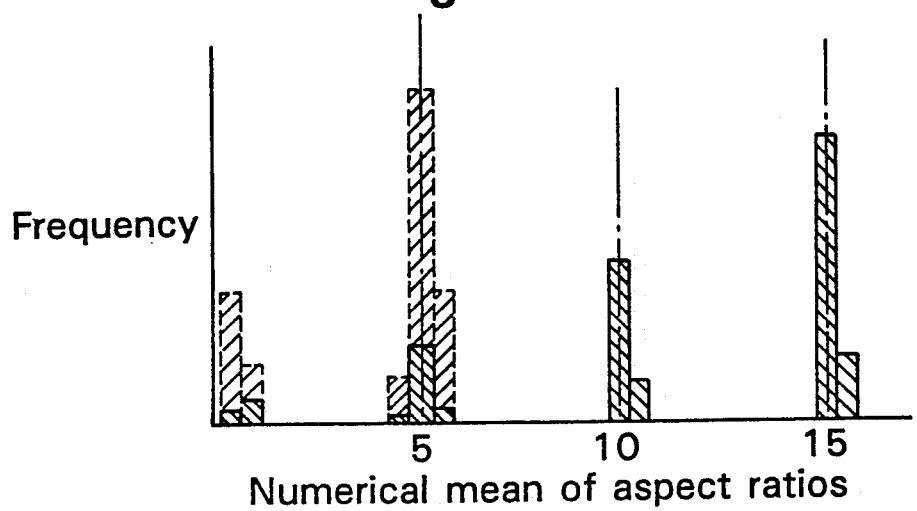
FIG. 4 is a graph showing the distribution of the aspect ratios of glass fibers in a molded product.
Figure 8:
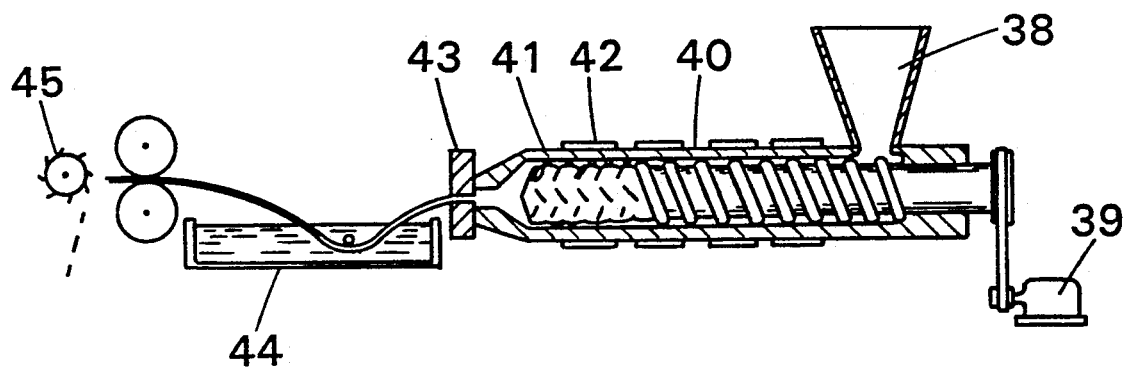
FIG. 8 is a sectional side view showing a screw-type extruder.
Figure 9:
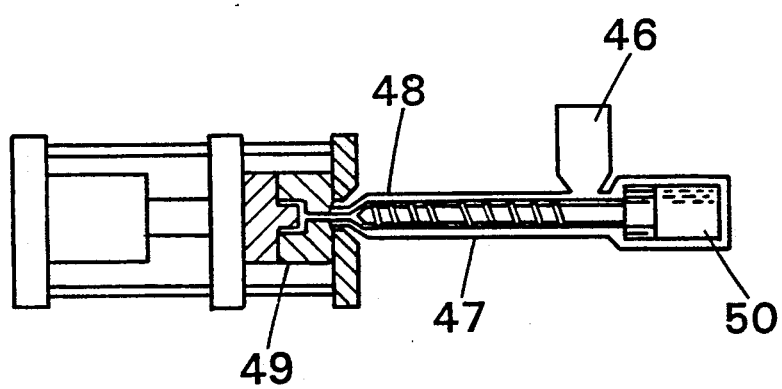
FIG. 9 is a sectional side view showing an injection mold.
Figure 10:
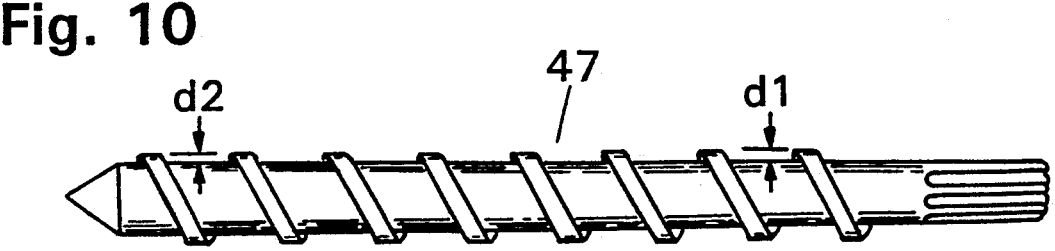
FIG. 10 is a side view showing the screw of FIG. 9.

Glass fibers with indentations of a spacing of 60 $\mu$m and with a diameter of 12 $\mu$m (in which there was a mean of 1-2 indentations observed per piece of glass fiber; lengths of the fibers were 120-180 $\mu$m and the aspect ratio was about 10-15; the distribution of the aspect ratios is shown by the solid line in the graph in FIG. 4) were mixed with polycarbonate of the mean molecular weight of 22000 at the proportion of 35% by weight, and dry blending was done in a tumbler, after which kneading was done with the screw-type extruder shown in FIG. 8 in the usual way; then cooling was followed by pelletizing, resulting in pellets. The said pellets were dried at 100° C. for 10 hours, and then again dried for another 5 hours at 130° C. Then, in the usual way, the pellets were supplied to the injection mold shown in FIG. 9 in which the pellets were fused at 300° C.; the viscosity of the fused pellets was 3500 poise, and the shearing rate was 1000 sec$^{-1}$. The fused pellets were then plasticized by full-flight screws at a constriction ratio of 3 under a screw back-pressure of 50 %1 kg/cm$^2$, after which the plasticized pellets were injected into the mold and cooled, resulting in a camera mirror-drum.

Figure 5:
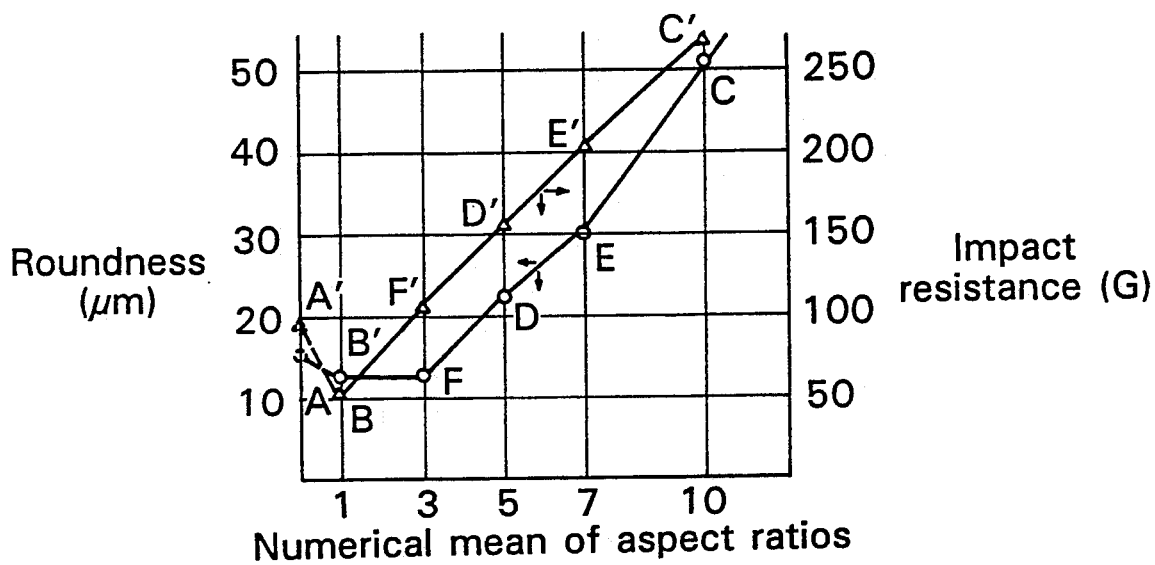
FIG. 5 is a graph showing the roundness and hardness of molded products obtained by the comparative examples and the examples of this invention.

The degree of roundness of the mirror drum was measured. The portion of the mirror drum for fitting together of the lenses had a degree of roundness of 22 $\mu$m. The impact resistance of the mirror-drum measured by use of a dropping-test machine was 157 G when a weight of 100 g was added to only the portions of the mirror-drum that were held by the said test machine. The roundness and the impact resistance were very satisfactory. The results are shown in FIG. 5 (D and D'). One portion of the final product was broken off, and the polycarbonate was washed with methyl chloride. When the glass fibers that remained were observed, it was found that the aspect ratio was 5 for almost all fiber pieces, as shown in FIG. 4. Pieces with an aspect ratio of 1 or less were contained in the product more than those in the starting material. However, there were almost no pieces with an aspect ratio of 10 or near 15 found in the starting material.

EXAMPLE 2

Glass fibers were formed in the same way as in Example 1, with a diameter of 12 $\mu$m but with an aspect ratio of 7, and pieces that were chopped at the indentations so that all of the pieces had an aspect ratio of 7 were mixed at the proportion of 35% by weight with polycarbonate with a molecular weight of 2000, dry-blended, kneaded with an extruder with the use of a full-flight screw, and dried in the same way as in Example 1. The resulting pellets were supplied to an injection molding provided with a full-flight screw with a constriction ratio of 2, and the resin was fused at 320° C. (the viscosity of which was 2500 poise) and the screw back-pressure was set to be 20 kg/cm$^2$, by which the fused resin was plasticized and molded, resulting in a molded product.

The roundness of the molded product and the degree of impact resistance, E and E', respectively, were 30 $\mu$m and 205 G (FIG. 5).

The accuracy of the measurements of the products that were molded by the use of this same mold in the same way was extremely good, and the aspect ratio of the glass fibers of individual products was very close to 7; in addition, the breakage of the fibers at other than the indentations was slight.

EXAMPLE 3

Glass fibers were formed in the same way as in Example 1, with a diameter of 12 $\mu$m and with indentations formed so that the spacing of the glass fibers was about 36 $\mu$m. These fibers were mixed with polycarbonate at the proportion of 40% by weight; other procedures are exactly the same as in Example 1, and a final product was obtained.

The roundness, 13 $\mu$m, was very satisfactory, and the impact resistance, 107 G, was quite adequate (see F and F' in FIG. 5).

The aspect ratios of almost all of the glass fibers in the product were in the vicinity of 3, with a somewhat wide distribution.

The hardness of the product was almost the same as that of the product in Example 1, as the amount of glass fibers compensated for their shortness; the hardness thereof was equivalent to that achieved when the amount of conventional glass fibers incorporated into the polycarbonate was at the proportion of 30% by weight.

COMPARATIVE EXAMPLE 1

When a product was obtained under the same conditions as that in Example 1 except that only the polycarbonate with a molecular weight of 22000 containing no glass fibers was used, the roundness, 18 $\mu$m, was good, but the impact resistance, 75 G, was somewhat unsatisfactory, and the hardness was unsatisfactory; the drawing out of the lenses from the product was not smooth (see A and A' in FIG. 5).

COMPARATIVE EXAMPLE 2

Figure 6:
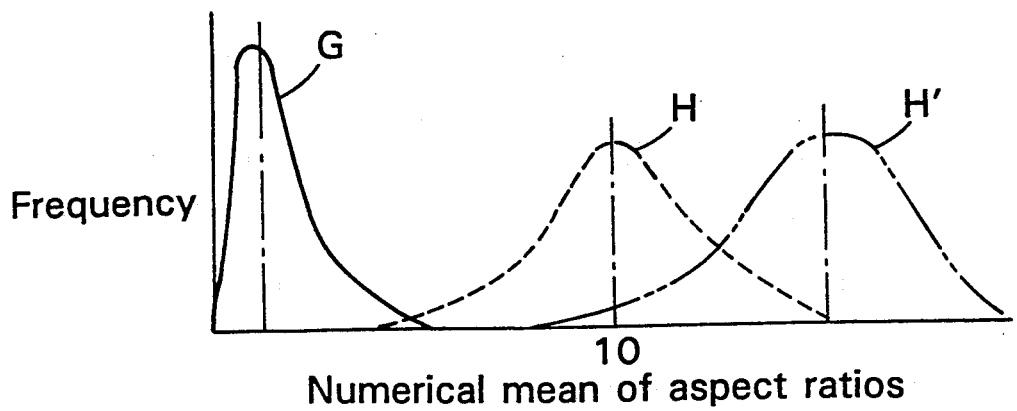
FIG. 6 is a graph showing the aspect ratios of the glass fibers of the comparative examples shown in FIG. 5.
Figure 7:
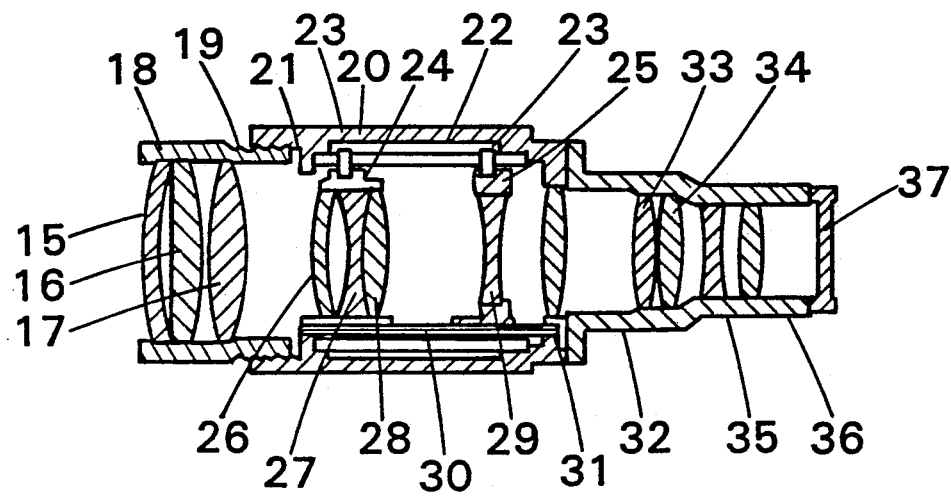
FIG. 7 is a section side view showing a conventional VTR camera.

A molded product was made in the same way as in Example 1 from polycarbonate with a molecular weight of 21000 containing glass fibers at the proportion of 40% by weight with a diameter of 12 μm and the distribution of aspect ratios of curve G in FIG. 6. The roundness of the product was 12.5 μm, which was very good, and the hardness was also sufficient, but the impact resistance, 50 G, was not good (see B and B' in FIG. 5).

COMPARATIVE EXAMPLE 3

Chopped glass fibers with a length of 3 mm each and a diameter of 12 μm each and polycarbonate with a molecular weight of 22000 were dry-blended in the proportion of 30% by weight to 100% by weight. The blend was mixed with the screw-type extruder shown in FIG. 8. The numerical means of the aspect ratios of the glass fibers in the blend was about 15; the distribution of the aspect ratios was as shown in curve H' of FIG. 6. When a product was formed in the same way as in Example 1 by the use of the said blend, the distribution of the aspect ratios of the glass fibers in the product was roughly as shown by curve H in FIG. 6, the values of the aspect ratios thereof being much lower than those of the starting material before molding. The roundness of the mold product, 50 μm, was poor. Both impact resistance and hardness were excellent (see C and C' in FIG. 5).

When the molding conditions were slightly changed, the distribution of the aspect ratios changed, and roundness and measurements such as the diameter of the product readily changed, as well.

With this invention, it is possible to obtain a camera mirror-drum with good precision and strength. Also, the aspect ratios of the fibers of this invention to be incorporated in the resin are determined in advance, so the final product has stable properties.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for the manufacture of camera mirror-drums comprising the steps of fusing glass in a vessel, drawing the fused glass from small holes in the bottom of said vessel to form glass fibers, forming indentations at regular intervals in said glass fibers while said fibers are still in a softened state, hardening said glass fibers, chopping said glass fibers at said indentations so that the chopped fibers are of uniform length, blending the chopped glass fibers of uniform lengths into a resin at certain proportions, and injection molding the mixture to produce a camera mirror-drum.

2. A method according to claim 1, wherein the spacing of said indentations that are formed in said glass fibers is about 3 to 7 times the diameter of the glass fibers.

3. A method according to claim 1, wherein said glass fibers are dispersed in said resin at the overall proportion of 35–40% by weight.

4. A method according to claim 1 wherein said resin is polycarbonate.

5. A method according to claim 1 wherein said glass fibers are chopped at the indentations by the bending of said glass fibers.

* * * * *